D. D. KELTNER.
REVERSIBLE VALVE.
APPLICATION FILED APR. 14, 1915.

1,185,333.

Patented May 30, 1916.

UNITED STATES PATENT OFFICE.

DELMAR DANIEL KELTNER, OF DES MOINES, IOWA.

REVERSIBLE VALVE.

1,185,333.         Specification of Letters Patent.    Patented May 30, 1916.

Application filed April 14, 1915. Serial No. 21,472.

*To all whom it may concern:*

Be it known that I, DELMAR DANIEL KELTNER, a citizen of the United States, and resident of Des Moines, in the county of Polk and State of Iowa, have invented a certain new and useful Reversible Valve, of which the following is a specification.

The object of my invention is to provide a reversible valve of simple, durable and inexpensive construction.

A further object is to provide such a valve adapted to be used in connection with a pump, which valve by a simple movement may be changed from one position to another, so that my pump may be used as a force pump or a suction pump.

A further object is to provide such a valve so constructed and arranged that the parts may be readily and easily assembled or taken apart for repair, replacement or the like.

Figure 1:
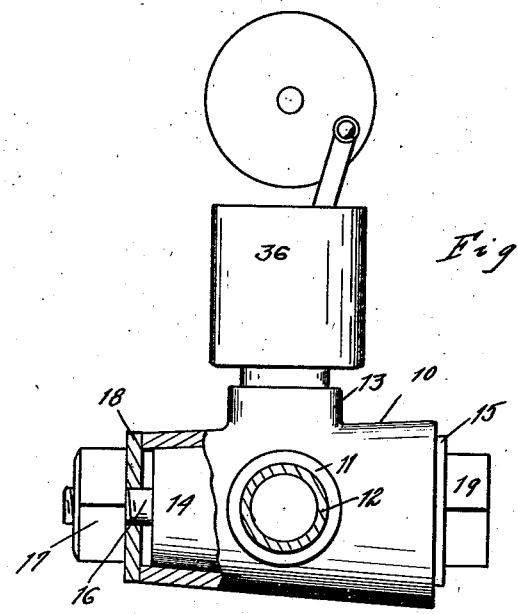
Figure 2:
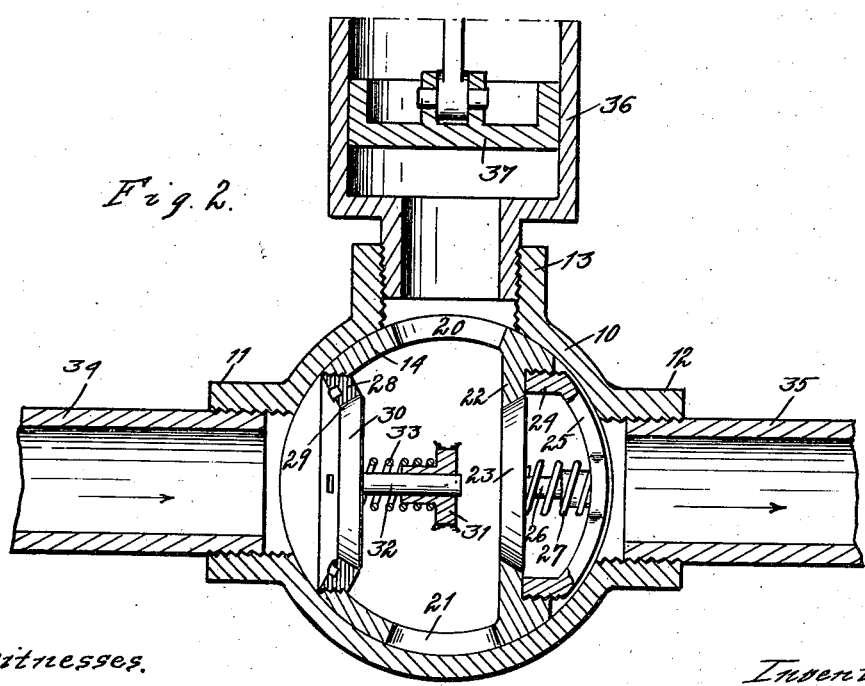

My invention consists in the arrangement, construction and combination of the various parts of the device whereby the objects contemplated are attained, as hereinafter more fully set forth pointed out in my claims, and illustrated in the accompanying drawings, in which:

Figure 1 shows an end elevation of a reversible valve embodying my invention. Fig. 2 shows a transverse vertical sectional view through the valve, and a portion of the pump attached thereto.

In the form of my invention illustrated in the accompanying drawings, I have used the reference numeral 10 to indicate a valve casing, having substantially the form of a truncated cone. In other words, the valve casing is substantially cylindrical, but slightly tapered from one end to the other for obvious purposes. The casing 10 is open at its ends and is provided at its side with cylindrical extensions 11 and 12. At its top, the casing 10 is provided with an upward cylindrical extension 13. All of said extensions being internally screw threaded.

Rotatably mounted within the valve casing 10 is a valve 14 having the form of a hollow truncated cone, similar in general shape to the casing 10, and of smaller diameter and arranged to rotate snugly within the casing 10. One end of the valve 14 forms a plug 15, which fills the larger end of the valve casing. The other end of the valve is provided with an extension bolt 16 screw threaded to receive a nut 17. Upon the nut, and between the nut, and the end of the casing 10 is a closure member 18. On the plug 15 is an angular head 19.

Formed in the wall of the valve 14 at diametrically opposite points, are openings 20 and 21, adapted in different position of the valve to register with the opening in the extension 13. On opposite sides of the valve are openings, around one of which is formed a valve seat, 22, on which is seated a valve 23.

An annular ring 24 is secured into the opening around the valve seat 22, and is provided with a member 25 connecting its opposite sides. The stem 26 of the valve 23 is slidably mounted in the connecting member 25. On the stem 26 between the member 25 and the valve head 23 is a coil spring 27. The other of the two last described openings is opposite the valve 23 and receives a screw threaded annular ring 28, forming a valve seat 29 on which is seated a valve 30.

Formed on the interior of the valve 14 is a web 31, in which the stem 32 of the valve 30 is slidably received. Mounted on the stem 32 between the web 31 and the valve head 30 is a coil spring 33. The extensions 11 and 12 are adapted to be connected with pipes or tubes 34 and 35 in any suitable way. The extension 13 is adapted to be operatively connected with a pump 36 having a piston 37.

In the practical use of my improved reversible valve, assuming that the pump has been connected and that the tubes 34 and 35 are connected with suitable mechanism or otherwise, it will be seen that when the valve is in the position shown in Fig. 2 and the pump is operated, a current of air or the like will be drawn in the direction indicated by the arrow in Fig. 2, the air being pumped through the tube 34 and expelled through the tube 35.

When it is desired to reverse the movement of the current of air or other fluid, the nut 17 is loosened whereupon the head 19 may be turned with a wrench or the like for turning the valve over, whereupon the valve 23 will be adjacent to the tube 34, and the valve 30 will be adjacent to the tube 35, and upon further turning of the pump, the direction of air or fluid movement will be opposite from that heretofore described.

Attention is called to the simplicity of construction of my valve, whereby the valve 14 can be readily and easily removed from the valve casing 10 for repairs, replacement or the like. Both of the valve heads 30 and 23 may be quickly and easily removed when the valve 14 has been removed from the casing by unscrewing the annular rings 24 and 28. In this connection attention is called to the fact that should there be any leakage through the valve 14 and casing 10, the nut 17 can be tightened for causing the valve 14 to frictionally engage the interior of the casing 10 for preventing such leakage.

Attention is here called to the great variety of uses to which such a valve may be put. In buildings equipped with a single set of pipes as for a vacuum cleaner, by using my improved valve in one pipe, the piping system may be employed for supplying fresh air to every room in the building having the piping connection, by simply reversing the valve. The same piping system may be used with a vacuum cleaner in the same way in mills, factories and the like.

My valve can be used with a pump for removing shavings sawdust, and by reversal of the valve the same valve may be used for filling pressure tanks and the like.

My valve might be used with a set of pipes where it was desired to use the same pipes as a compressor for soda water fountains, and in connection with a vacuum cleaner.

On fire engines the valve can be used, so that when the hose is connected, the pump can be operated to serve the water directly to the blaze without turning the engine or motor car around, or without twisting, crossing or tangling the hose, or changing the pump connections and with practically no loss of time. In many cases where water is used, the advantage of being able to throw the stream in either direction by simply reversing the valve is obvious.

In spraying fruit, the same valve may be used for pumping a barrel, having chemicals therein, full of water, and then for emptying the barrel and spraying the contents on the trees.

The numeration of instances of the possible uses of my improved reversible valve might be indefinitely extended.

It will be understood that some changes may be made in the construction and arrangement of the parts of my improved reversible valve without departing from its essential features and purposes, and it is my intent to cover by this application any such changes which may be included within the scope of my claims.

I claim as my invention.

1. In a device of the class described, a hollow valve casing, having diametrically opposite openings adapted to be suitably connected with conducting tubes, and having a third opening adapted to be connected with a pump or the like, a hollow member adapted to rotate in said casing having diametrically opposite openings adapted in different positions of the said hollow member to register with said last described opening in said casing, and having two other opposite openings adapted in different positions of the hollow member to register with the respective two first described openings in the casing, valve seats in said hollow member, intake and outlet valves on said seats, and yielding means tending to hold said valve seated in any position of the hollow member.

2. In a device of the class described, a hollow valve casing, having diametrically opposite openings adapted to be suitably connected with conducting tubes, and having a third opening adapted to be connected with a pump or the like, a hollow member adapted to rotate in said casing having diametrically opposite openings adapted in different positions of the said hollow member to register with said last described opening in said casing, and having two other opposite openings adapted in different positions of the hollow member to register with the respective two first described openings in the casing, a valve seat formed in said hollow member, a valve seated thereon, an annular ring secured into said hollow member around said valve seat, a member connecting the opposite sides of said ring, a stem on said valve slidably mounted in said last described member, a spring on said stem tending to hold said valve seated, an annular ring opposite said first valve having a valve portion forming a valve seat, a valve seated on said last described seat, a supporting member for said hollow member, a stem on said last described valve slidably mounted in said supporting member, and a spring on said last named stem between the valve thereof and said supporting member, said annular rings being detachable.

3. In a device of the class described, a hollow casing, having an opening adapted to be connected with a pump, and having opposite openings adapted to be secured to conducting tubes, a hollow member mounted within said casing and adapted to rotate therein, having openings in different positions of the hollow member registering with the first described opening in the casing, and having two other opposite openings with intake and outlet valves respectively, valves for controlling said last two described openings, and yielding means tending to hold said valves seated.

Des Moines, Iowa, March 31, 1915.

DELMAR DANIEL KELTNER.

Witnesses:
A. SHERMAN,
J. MAHER.